Figure 1:
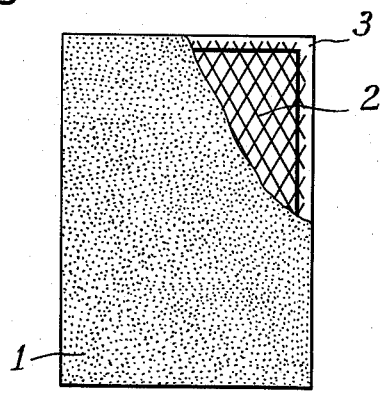

April 8, 1958 F. PETERS 2,830,108
METHOD OF FORMING COLD-WELDED NEGATIVE
ELECTRODES FOR ALKALINE ACCUMULATORS
Filed Sept. 5, 1952

Inventor
Frsimut Peters

United States Patent Office 2,830,108
Patented Apr. 8, 1958

2,830,108
METHOD OF FORMING COLD-WELDED NEGATIVE ELECTRODES FOR ALKALINE ACCUMULATORS

Freimut Peters, Hagen, Westphalia, Germany, assignor to Accumulatoren-Fabrik Aktiengesellschaft, Hagen, Westphalia, Germany, a joint-stock company of German law Application September 5, 1952, Serial No. 308,173

Claims priority, application Germany September 8, 1951

6 Claims. (Cl. 136—20)

This invention relates to accumulators, and more particularly to negative electrodes for alkaline accumulators and methods of making the same.

Heretofore negative electrodes for alkaline accumulators were made by pressing the negative mass produced in the conventional manner, under a pressure of from 300 to 500 kilograms per square centimeter, into pastil-shaped bodies which were inserted in packets or envelopes made of perforated sheet metal, one or more of such packets being mounted in frames and forming the negative electrodes of an alkaline accumulator.

I have discovered that the envelopes for the pastils can be eliminated and an improved electrode can be made simply and directly, if the active mass comprises an electrochemically active metal relatively poor in oxide, such as, for example, cadmium including from 5 to 30 percent of oxide, is pressed in suitable moulds, at room temperature and a materially higher pressure, i. e. a pressure from about 700 to about 1500 kilograms per square centimeter. This treatment yields a pressed body of stable form which, inserted in a suitable frame serving as a current lead, can be used directly as the negative electrode. The pressure treatment has the result that the particles of the powder poor in oxide, of the active mass are welded and cemented together.

In general, only about 40 to 50 percent of the electrochemically active metal such as cadmium, take part in the electrochemical processes, so that about 60 to 50 percent remains in the metallic state and forms a coherent, electrically conductive skeleton structure. Consequently, it is no longer necessary to produce by a special process, a special porous sintered skeleton structure on which, subsequently and by an additional, complicated process, the active mass is precipitated, inasmuch as the pressure treatment according to the invention utilizes the electrochemically inactive part of the active mass for producing a porous, sufficiently conductive skeleton structure, the oxidic part in the main forming the electrochemically active, i. e. current supplying part.

According to a modification of the invention, there may be admixed to the active mass from 0 to about 150 percent of an electrochemically inactive metal powder which is finely subdivided and has a large surface, such as, for example, nickel powder obtained electrolytically, or from carbonyl, or in any other suitable manner.

On addition of inert metal powder, the particles thereof, under the influence of the pressure treatment according to the invention, are cold-welded together by the metallic cadmium which thus acts as a kind of metallic cement and together with the inert powder, forms the porous skeleton structure.

Thus the cold-welding property of cadmium is utilized in the manufacture of electrodes for alkaline accumulators according to the invention. This cold-weldable property, however, is not a monopoly of cadmium, and the invention contemplates the use for the purposes of the invention, of other metals having cold-weldable properties, i. e. being capable of deformation and cold welding together under pressure, such as, for example, lead, tin, and zinc.

Another modification of the invention contemplates imparting an increased strength to the plates by using therein a reinforcing filler made of an electrochemically inactive metallic material, such as nickel, nickel plated iron or nickel alloys, and provided in the form of webs, wires, wool, perforated sheet metal or the like. Preferably though not necessarily, this reinforcing structure may be provided so as to form also the leads for current supply and delivery. The current supply and delivery leads, however, also may be provided subsequently by inserting the plates in a suitable frame, or by providing projecting portions of the reinforcing structure with current supply and delivery leads. The size and thickness of the plates are limited solely by the strength obtained. They may be inserted, individually or combined, in a frame, or may be pressed on a larger metallic support.

In the drawing affixed to this specification and forming part thereof an embodiment of my invention is illustrated diagrammatically by way of example.

Figure 2:
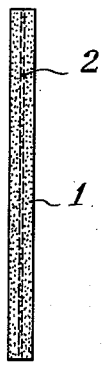
Figure 3:
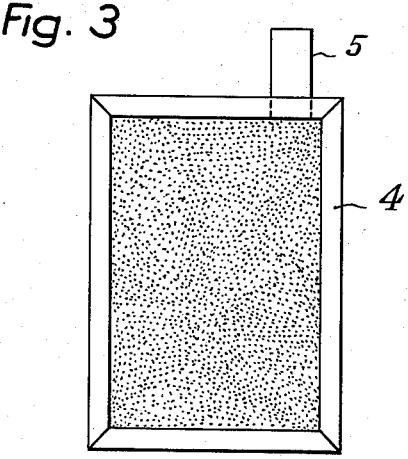
Figure 4:
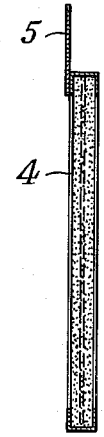

In the drawing:

Figs. 1 and 2 are a plan view and a vertical cross-section of the active mass body, while Figs. 3 and 4 show the electrode as a whole.

The active mass 1 is pressed around the wire gauge insert 2 mounted in an inner frame 3. 4 is the outer frame of the electrode and 5 is a terminal.

The drawing shows that the electrode surface is free from any reinforcements.

I wish it to be understood that I do not desire to be limited to the exact details of construction, composition, procedure and operation described as numerous modifications within the scope of the appended claims will be obvious to a person skilled in the art.

I claim:

1. The method of producing a negative electrode for an alkaline type accumulator which comprises the steps of pressing a homogeneous mixture comprising pulverized cold-weldable negative electrode metal, pulverized active oxide which is reducible upon charging of the accumulator, and pulverized metallic material which is substantially inert during charge and discharge of the accumulator, said pressing of said mixture being performed at room temperature in a mold providing a desired shape for the finished electrode and within a pressure in the range from 700 to 1400 kilograms per square centimeter, the particles of said pulverized electrode metal and said inert metal becoming cold-welded together under said pressure so as to form a self-supporting porous electrode structure having said oxide uniformly distributed therethrough and being accessible to the electrolyte of said battery, said electrode metal being present in a proportion sufficiently great to provide an excess which remains inert upon charge and discharge of said accumulator, thereby acting so as to preserve and maintain said cold-welded self-supporting structure, the mixture of metal and the oxide thereof comprising 5 to 30% of oxide and 95 to 70% of metal, and the inert metallic material being added to the mixture of said metal and oxide thereof in an amount ranging from a minimum significant quantity to one and one-half times the weight of the mixture of active metal and oxide thereof.

2. The method according to claim 1, wherein said active electrode metal is selected from the group consisting of cadmium, lead, tin and zinc.

3. The method according to claim 1, wherein said electrode metal consists substantially entirely of cadmium.

4. The method according to claim 1, in which said inert material comprises nickel.

5. The method according to claim 1, comprising the further step of inserting a metallic reinforcing structure for said porous supporting structure and formed of a metal substantially chemically unaffected by charging and discharging of the accumulator, into said mold along with said homogeneous mixture prior to said pressing step.

6. The method according to claim 5, in which the reinforcing structure is formed of nickel.

References Cited in the file of this patent

UNITED STATES PATENTS

| | | | |
|---|---|---|---|
| 266,762 | Brush | | Oct. 31, 1882 |
| 275,986 | Brush | | Apr. 17, 1883 |
| 670,024 | Jungner | | Mar. 19, 1901 |
| 692,298 | Jungner | | Feb. 4, 1902 |
| 897,833 | Hubbell | | Sept. 1, 1908 |
| 977,086 | Estelle | | Nov. 29, 1910 |
| 2,554,125 | Salauze | | May 22, 1951 |
| 2,643,276 | Salauze | | June 23, 1953 |
| 2,646,455 | Jeannin | | July 21, 1953 |
| 2,675,418 | Nichols | | Apr. 13, 1954 |

FOREIGN PATENTS

| | | |
|---|---|---|
| 16,270 of 1891 | Great Britain | Mar. 26, 1892 |